United States Patent
Eberlein et al.

(10) Patent No.: US 11,405,472 B2
(45) Date of Patent: *Aug. 2, 2022

(54) MIGRATION DELTA ANALYZER AND TRANSITION RECOMMENDATION ENGINE

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/471,338

(22) Filed: Sep. 10, 2021

(65) Prior Publication Data

US 2022/0217208 A1 Jul. 7, 2022

Related U.S. Application Data

(63) Continuation of application No. 17/142,370, filed on Jan. 6, 2021, now Pat. No. 11,153,394.

(51) Int. Cl.
| | |
|---|---|
| *G06F 15/16* | (2006.01) |
| *H04L 67/148* | (2022.01) |
| *H04L 67/025* | (2022.01) |
| *H04L 67/61* | (2022.01) |
| *H04L 67/75* | (2022.01) |

(52) U.S. Cl.
CPC .......... *H04L 67/148* (2013.01); *H04L 67/025* (2013.01); *H04L 67/61* (2022.05); *H04L 67/75* (2022.05)

(58) Field of Classification Search
CPC ... H04L 67/148; H04L 67/025; H04L 67/322; H04L 67/36

USPC .................................................. 709/203, 217
See application file for complete search history.

(56) References Cited

U.S. PATENT DOCUMENTS

| | | | |
|---|---|---|---|
| 9,703,554 B2 | 7/2017 | Eberlein et al. | |
| 2014/0146055 A1* | 5/2014 | Bala .................... | G06F 9/45558 345/501 |
| 2014/0149494 A1* | 5/2014 | Markley ........... | G06F 16/90335 709/203 |
| 2014/0344395 A1 | 11/2014 | Alexander | |
| 2017/0046143 A1* | 2/2017 | Kochhar ................... | G06F 8/71 |
| 2017/0093640 A1 | 3/2017 | Subramanian et al. | |
| 2019/0253485 A1 | 8/2019 | Banetjee | |
| 2020/0007457 A1 | 1/2020 | Greenstein et al. | |

(Continued)

OTHER PUBLICATIONS

Archive.sap.com [online], "LSMW (Legacy System Migration Workbench)" Sep. 2020, [retrieved on Sep. 30, 2020], retrieved from: URL <https://archive.sap.com/documents/docs/DOC-26159>, 4 pages.

(Continued)

*Primary Examiner* — Duyen M Doan
(74) *Attorney, Agent, or Firm* — Fish & Richardson P.C.

(57) ABSTRACT

Implementations include receiving, by a migration delta analyzer of a software system, an object list including objects accessed by the on-premise application, determining, by the migration delta analyzer, at least one migration option for each object in the object list using a mapping table, receiving, through a user interface, input from a user representing a selection of migration option for each object in the object list, and providing a cloud application based on the selected migration option for each object in the object list.

20 Claims, 5 Drawing Sheets

(56) References Cited

U.S. PATENT DOCUMENTS

2021/0174280 A1* 6/2021 Ratnapuri ............... H04L 67/10
2021/0342362 A1* 11/2021 Haravu .................. G06F 16/27
2022/0019385 A1* 1/2022 Karr ..................... G06F 3/0688

OTHER PUBLICATIONS

U.S. Appl. No. 17/142,370, filed Jan. 6, 2021, Eberlein et al.
U.S. Appl. No. 17/487,026, filed Sep. 28, 2021, Dai et al.

* cited by examiner

MIGRATION DELTA ANALYZER AND TRANSITION RECOMMENDATION ENGINE

CLAIM OF PRIORITY

This application claims priority under 35 USC § 120 to U.S. patent application Ser. No. 17/142,370, filed on Jan. 6, 2021, titled "MIGRATION DELTA ANALYZER AND TRANSITION RECOMMENDATION ENGINE"; the entire contents of which are hereby incorporated by reference.

BACKGROUND

On-premise (oP) applications can be described as software that is located within the physical confines of an enterprise (e.g., in a data center owned by and/or operated on behalf of an enterprise). Over the last several years, there has been a move toward off-premise applications that are executed in cloud computing environments (e.g., applications provided in the so-called "Software-as-Service" (SaaS) paradigm). The cloud computing trend has grown rapidly and has become streamlined for multi-tenant cloud environments. In some instances, both an on-premise application and cloud application are provided from the same software vendor. That is, the software vendor provides an on-premise and a cloud version of its software. In some instances, the on-premise and cloud versions share similar scope and processes. In the interest of cost savings and reduced complexity, more and more enterprises are looking to migrate from on-premise applications to the cloud-based (off-premise) applications. However, problems may occur when migrating the on-premise application to the cloud due to, for example, incompatibilities that are inherent between on-premise and cloud environments.

Migration from an on-premise application to an offering in the cloud environment is not comparable to an upgrade process to a new on-premise version. Specifically, the source code of the on-premise application cannot be simply put in the cloud environment and executed. The target cloud application in the cloud environment needs to be developed with techniques and requirements in the offering of the cloud environment, while having functionalities similar to the on-premise application. Many domains of applications, such as codified processes, object data structures, roles and authorizations, need to be newly designed for the cloud application.

Further, if the effort of handling a migration process is comparable to the effort of having a completely new implementation established by another service provider, customers (e.g., the enterprise with the on-premise applications) would be more open to evaluating a comparable cloud application offering from competitors of the software vendor. That is, if the migration process is so difficult (e.g., in terms of time or resources), enterprises may be motivated to look to other cloud applications. Thus, for a software vendor that offers a solution in the cloud, it can be imperative to provide a technically efficient migration process, as well as reduced migration cost and migration times for migration from on-premise applications.

SUMMARY

Implementations of the present disclosure are directed to migration from on-premise applications to cloud environments. More particularly, implementations of the present disclosure are directed to a migration delta analyzer and transition recommendation engine for migration of code and/or data from on-premise applications to cloud applications. As described in further detail herein, implementations of the present disclosure provide, among other features, comparing of an on-premise application with capabilities of a cloud environment and recommending migration approaches for identified differences in source code and/or data.

In some implementations, actions include receiving, by a migration delta analyzer of a software system, an object list including objects accessed by the on-premise application, determining, by the migration delta analyzer, at least one migration option for each object in the object list using a mapping table, receiving, through a user interface, input from a user representing a selection of migration option for each object in the object list, and providing a cloud application based on the selected migration option for each object in the object list. Other implementations of this aspect include corresponding systems, apparatus, and computer programs, configured to perform the actions of the methods, encoded on computer storage devices.

These and other implementations can each optionally include one or more of the following features: actions further include adding, by the migration delta analyzer, a customer extension to the mapping table, the object including the customer extension, querying, by the migration delta analyzer, the cloud application for at least one target object similar to the customer extension, and filling the mapping table with the at least one target object as at least one migration option of the customer extension; actions further include ranking the at least one migration option for each object in the object list, and displaying the at least one migration option for each object in the object list based on the ranking; actions further include displaying, through the UI, uniform resource locators (URLs) corresponding to each object in the object list and the at least one migration option for each object in the object list; the at least one migration option includes a match of a target object in the cloud applications, a deletion of the object and a creation of extension corresponding to the object in the cloud application; the objects in the object list include business process, business objects and fields thereof, and user roles; and the at least one migration option corresponding to an object of business process in the object list comprises a business process variant and a long-tail process.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
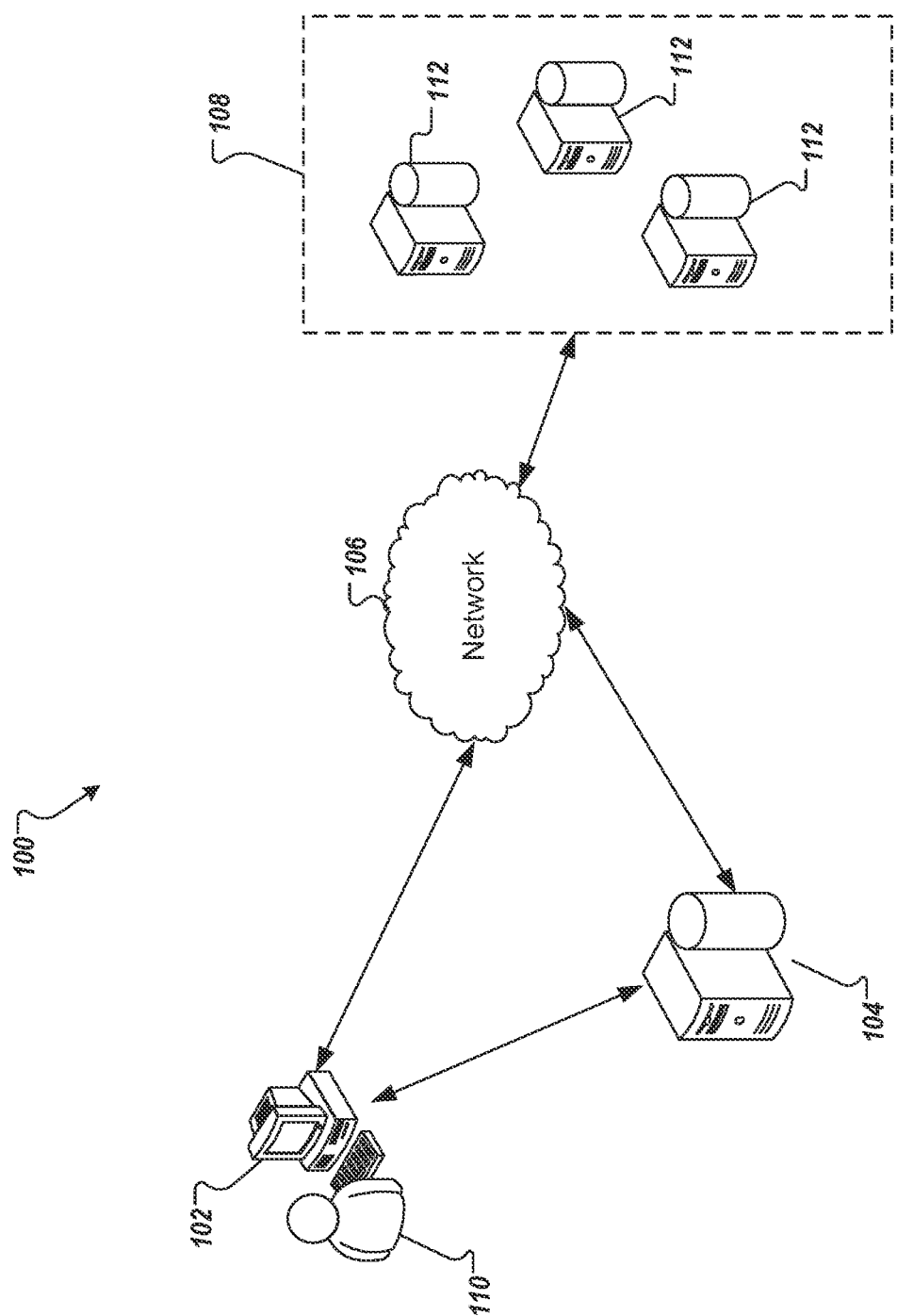
FIG. 1 depicts an example architecture in accordance with implementations of the present disclosure.

Implementations of the present disclosure are directed to migration from on-premise applications to cloud environments. More particularly, implementations of the present disclosure are directed to a migration delta analyzer and transition recommendation engine for migration of code and/or data from on-premise applications to cloud applications. As described in further detail herein, implementations of the present disclosure provide, among other features, comparing of an on-premise application with capabilities of a cloud application and recommending migration approaches for identified differences in source code and/or data.

In some implementations, actions include receiving, by a migration delta analyzer of a software system, an object list including objects accessed by the on-premise application, determining, by the migration delta analyzer, at least one migration option for each object in the object list using a mapping table, receiving, through a user interface, input from a user representing a selection of migration option for each object in the object list, and providing a cloud application based on the selected migration option for each object in the object list.

To provide further context for implementations of the present disclosure, when migrating from an on-premise application to a cloud environment (e.g., SaaS environment), enterprises are typically motivated by advantages of reduced technical burden (e.g., maintaining own data center) and other efficiencies offered by cloud environments. In general, on-premise applications are typically set with an infinite space of configuration and enable customers (e.g., enterprises) to customize vendor-provided software (e.g., add custom code, modify existing code, use application programming interfaces (APIs) that are not declared as "release stable"). However, this may come with follow-up costs for the customer to adjust and test configurations, ensure compliance with legal regulations, and ensure code functions with new versions and/or system updates provided by the vendor. This all provides further motivation for customers to look to a cloud application.

In migrating from on-premise to the cloud, migration tools can be provided that assist with the migration process. If a migration tool handling the migration process migrates code and/or data to on-premise applications "as is," significant difficulties can arise. For example, in the above-described case of customers customizing applications, the above-discussed example follow-up costs would remain and the customer may not get the full advantage of migrating the application to the cloud (e.g., software updates might not be applied to customized software modules).

It can be further noted that, in a cloud environment, the configuration space is limited, and extensions are only possible using lifecycle-stable interfaces. The vendor (i.e., the service provider of the cloud environment) can pre-test code of new versions and/or updates of the application or platform, and push new versions/updates to the offering (i.e., migrated application in the cloud environment) without the need for the customer to adjust code and modifications. Thus, the test effort for a customer is lower as compared to on-premise. In other words, applications in cloud environments are designed for de-coupled lifecycle of code from the vendor side and the customer side. By this, a vendor can "push" new versions/updates of software independently from the customers, such that the customer does not need to adjust and test self-owned code and content as a result of the update. The design of de-coupled lifecycle should be another factor in motivating customers to migrate from on-premise to the cloud.

However, and to have the advantages cloud environments offer (e.g., the quality of de-coupled lifecycle), custom code, modifications, and content in the on-premise application cannot be migrated as-is (e.g., one-to-one) to the cloud environment. In general, custom code (e.g., the extensions developed by the customer) has to follow extension points used in public interfaces of the cloud environment and modifications are not allowed. If the customer has to re-engineer the custom code from the on-premise application and map the custom code to the target application in the cloud environment, the cost and technical effort can be considerable.

As compared to on-premise, cloud environments offer a more integrated approach with fewer configuration options. That is, the configurations are controlled by fewer switches, and the configurations are computed out of these switches. By this, the onboarding and configuration process is streamlined, cost is lowered, and implementation initialization can be shortened as well. Also, the vendor is able to push changes to the application without further interaction with the customer. This implies that flexibility (e.g., customization) in processes executed by the cloud-based application is reduced as compared to on-premise. Consequently, migration to the cloud can require mapping the current process (and technical settings) of the on-premise application to a more constrained offering in the cloud environment. The customer needs to re-engineer the running processes and configurations in the on-premise application, identify what is operable in the cloud environment.

For on-premise applications, "long-tail" application modules with low adoption ratio can still be kept and maintained in the on-premise environment, because the cost of the "long-tail" application modules can be easily kept under control. However, offering the same functionality in the cloud requires significant additional technical costs (e.g., defining configurations, applying changes, testing the code and configuration, ensuring security, operations costs). As a result, the vendor operating the cloud environment often cuts off the "long-tail" in the standard offering of the cloud environment and limits the functionalities in the offering to only the functionalities that are used by most customers. For a customer migrating from an on-premise application to the target application in the cloud environment, this can result in a loss of functionalities, such as the functionalities provided on-premise, but no longer available in the cloud. Even if the functionality is "long-tail" from a vendor perspective, it can be significant or a "differentiating core" functionality for the customer.

When cutting the sparsely adopted code of the "long-tail" modules and simplifying the application for cloud use, the vendor may also simplify data structures in the cloud environment as well. The simplification of data structures may lead to deletion of table fields, for example. Additionally, customers may extend tables that are originally defined by the vendor with their own field definitions to enable their extension code. On the other hand, the new standard of table fields in the cloud environment may already include the table fields that fits the need from the customers. As a result, the extension field made by the customer in the on-premise application becomes redundant in the cloud-based application.

For a customer, the migration process from on-premise application to the cloud environment is not only a technical data migration (which can be easily computed out of existing configuration), but a complex process including decisions on a higher semantic level. Accordingly, migration process support on this higher semantic level is required to reduce migration cost (e.g., in terms of expense of technical resources, such as memory, processing power, bandwidth) and accelerate the migration process (which can significantly affect the customer's ability to maintain continued enterprise operations).

In view of the foregoing, and as introduced above, implementations of the present disclosure provide a migration delta analyzer and transition recommendation engine for migration from on-premise applications to cloud applications. As described in further detail herein, implementations of the present disclosure provide, among other features, comparing of an on-premise application with capabilities of a cloud environment and recommending migration approaches for identified differences in source code and/or data. Implementations of the present disclosure address technical and practical challenges discussed herein.

FIG. 1 depicts an example architecture 100 in accordance with implementations of the present disclosure. In the depicted example, the example architecture 100 includes a client device 102, an on-premise server 104, a network 106 and a server system 108. The server system 108 includes one or more server devices 112. In the depicted example, respective users 110 interact with the client devices 102. In an example context, a user 108 can include a user, who interacts with an application that is hosted by the on-premise server 104 or the server system 108. In another example context, a user 110 can include a user, who interacts with the server system 108 to perform one or more migration procedures, described in further detail herein.

In some examples, the user 110 is an employee of an enterprise and the on-premise server 104 is located within the physical confines of the enterprise (e.g., in a data center operated by or behalf of the enterprise). In some examples, the on-premise server 104 includes at least one server and at least one data store. In the example of FIG. 1, the on-premise server 104 is intended to represent various forms of servers including, but not limited to a web server, an application server, a proxy server, a network server, and/or a server pool. In general, the on-premise server 104 accept requests for application services from client device 102 directly or over the network 106. In some examples, the on-premise server 104 is run and maintained by the enterprise. In some examples, an application executed on-premise server 104 is provided by a vendor, and can be maintained, modified, and/or extended by the enterprise based on the particular needs of the enterprise.

In some examples, the client device 102 can communicate with the on-premise server 104 and/or the server system 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device includes at least one server and at least one data store. In the example of FIG. 1, the server devices are intended to represent various forms of servers including, but not limited to a web server, an application server, a proxy server, a network server, and/or a server pool. In general, server systems accept requests for application services and provides such services to any number of client devices (e.g., the client devices 102) over the network 106.

In some implementations, one or more data stores of the server systems store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An-memory database can be contrasted with database management systems that employ a disk storage mechanism. In some examples, in-memory databases are faster than disk storage databases, because internal optimization algorithms can be simpler and execute fewer CPU instructions, e.g., require reduced CPU consumption. In some examples, accessing data in an in-memory database eliminates seek time when querying the data, which provides faster and more predictable performance than disk-storage databases.

Implementations of the present disclosure are described in further detail herein with reference to an example context. The example context includes applications that are executed on a client-server architecture, such as the example architecture 100 of FIG. 1. In some examples, applications can be provided in a suite that includes two or more applications. Example applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications).

Referring again to FIG. 1, and in the example context, one or more applications can be hosted by the on-premise server 104 or the server system 108. For example, applications hosted on the on-premise server 104 are referred to as on-premise applications, and applications hosted on the server system 108 are referred as cloud applications. That is, the server system 108 provides a cloud platform, on which cloud-based applications are provisioned.

With respect to on-premise, the user 110 can interact with an application hosted on the on-premise server 104 using the client device 102. More specifically, a session can be established between the client device 102 and the on-premise server 104, during which session the user 110 is able to interact with one or more applications hosted on the on-premise server 104. The one or more applications can enable the user to interact with data stored in one or more databases. In some examples, interactions can result in data being stored to the database, deleted from the database, and/or edited within the database.

In some instances, and as discussed in further detail herein, a migration is to occur to migrate from use of an on-premise application to a cloud application. For example, and with continued reference to FIG. 1, the enterprise maintaining the on-premise application can decide to migrate to a corresponding cloud application that is hosted in the server system 108.

As introduced above, implementations of the present disclosure provide a migration delta analyzer and transition recommendation engine for migration of on-premise applications to cloud environments. More particularly, implementations of the present disclosure provide a semi-automated process to support customers in migration. In some examples, the target application configuration in the cloud environment is defined and, based on this definition, differences and deviations (collectively referred to herein as a delta) between the on-premise application and the cloud-based application are analyzed. Migration options to address the delta are provided to the customer with recommendations. The migration process can be executed based on the migration options and the inputs (e.g., the choice of options) from the customer.

Figure 2:
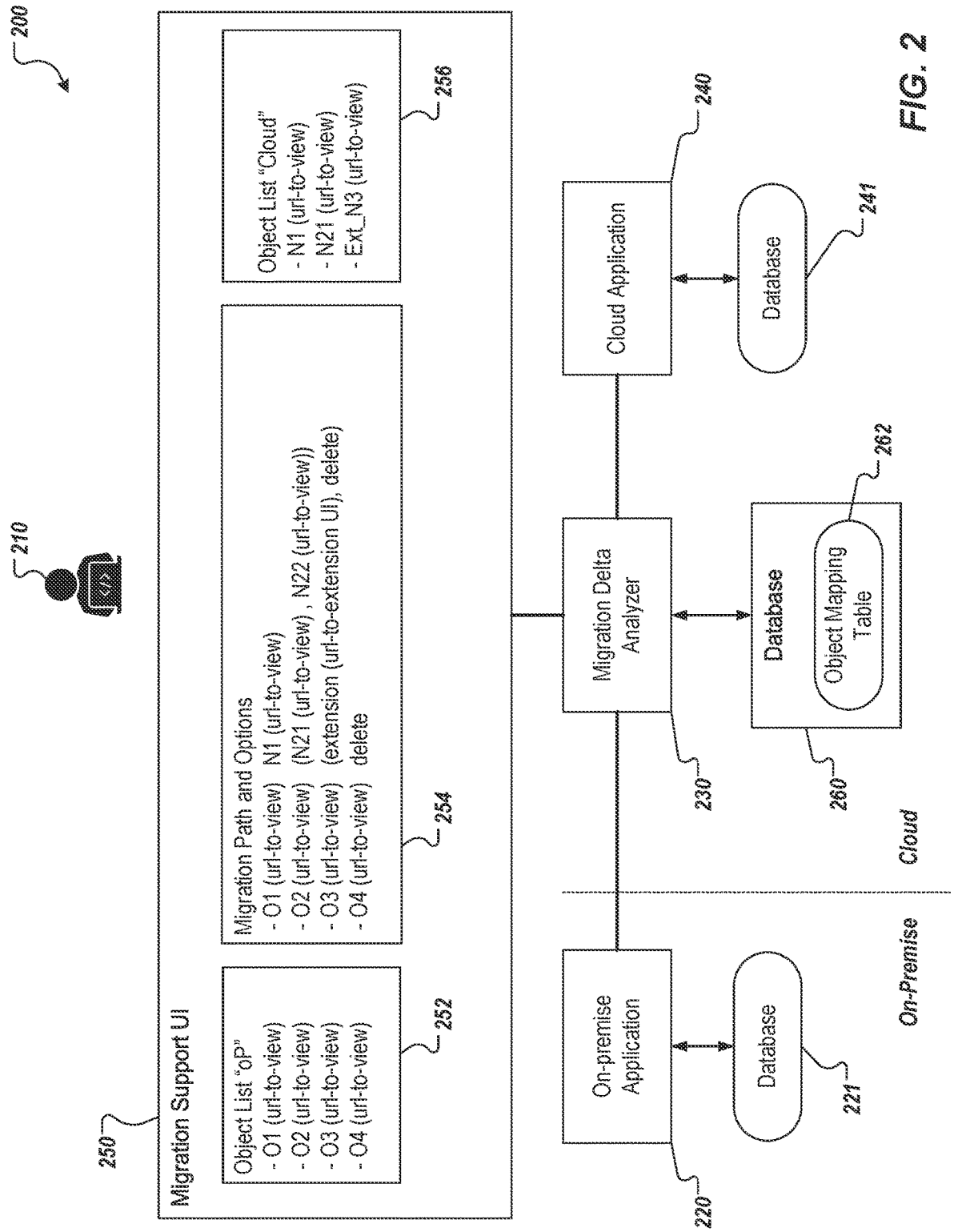
FIG. 2 schematically depicts at least a portion of a conceptual architecture for execution of a migration process in accordance with implementations of the present disclosure.

FIG. 2 schematically depicts at least a portion of a conceptual architecture 200 for execution of a migration process in accordance with implementations of the present disclosure. The example of FIG. 2 includes an on-premise application 220 (e.g., executed by the on-premise server 104), a migration delta analyzer 230, a cloud application 240 (e.g., executed by the server system 108), a migration support user interface (UI) 250, and a database 260. The migration support UI 250 provides an on-premise (oP) object list 252, a migration path and options UI 254, and a cloud object list 256. The on-premise application 220 interacts with a database 221 and the cloud application 240 interacts with a database 241. The database 260 stores an object mapping table 262. In some examples, the on-premise application 220 can also be referred to as a source and/or a source application in the context of being a source, from which migration is to occur. In some examples, the cloud application 220 can also be referred to as a target and/or a target application in the context of being a target, to which migration is to occur.

In accordance with implementations of the present disclosure, the migration delta analyzer 230 is configured to manage and control the migration process. The migration delta analyzer 230 is also configured to use the object mapping table 262 (referred to herein as "T_oo-map") stored in the database 260 to record a delta (e.g., deviations and differences) between the on-premise application 220 and the target cloud application 240. In some examples, migration options for objects used in the on-premise application 220 are also recorded in the object mapping table 262. It is noted that, as a result of the migration process, the target cloud application 240 is configured to execute for the enterprise, for which the on-premise application 220 had been executing prior to migration. The target cloud application 240 is established based on the on-premise application 220 and the offering (e.g., technologies and constraints) of the cloud environment with the support from the migration delta analyzer 230.

In some implementations, the delta analysis is executed by the migration delta analyzer 230 when the on-premise application 220 and the cloud application 240 are connected to the migration delta analyzer 230. In some examples, for the particular cloud application 240 an object table (e.g., the object mapping table 262 (T_oo-map)) can be provided that defines a set of objects (data objects) that are used by the cloud application 240. These can be referred to as target objects. In some examples, the object mapping table 262 is a vendor-defined list of objects that are included in the cloud application 240. For example, the object mapping table 262 can be created by vendor developers. In some examples, the object mapping table 262 contains a mapping of objects in the on-premise application 220 to objects in the cloud application 240. The developers know the names of objects used in the on-premise application 220 and objects in the cloud application 240, as well as provide information on deviations (e.g., in the example of a role, if the role has more, less, or the same access permissions in the cloud as on-premise). For example, the developer identifies two roles in the on-premise application and cloud application having the same semantic (e.g. by taking objects having the same name and comparing the object definition, the role is defined by a list of authorization objects). The developer compares the authorization objects in the role between on-premise and cloud.

In some implementations, the migration delta analyzer 230 queries the on-premise application 220 and receives an object list from the on-premise application 220. In some examples, the object list includes a set of objects (data objects) used in the on-premise application 220. These can be referred to as source objects. In some examples, the objects in the object list include vendor objects (e.g., objects provided by the vendor with the on-premise application 220), custom objects (e.g., objects created by the customer within the on-premise application 220), and extension objects (e.g., vendor objects modified by the customer within the on-premise application 220). In some examples, a uniform resource locator (URL) is provided for each source object in the object list. The URLs are directed to a UI or an API to enable, for example, a user (such as the user 210) to navigate to and view the respective source object in the on-premise application 220. In some examples, the URLs are related to the name of the corresponding objects in the object list. Accordingly, the source object list with URLs can be displayed to a user 210 in the migration support UI 250 as the on-premise (oP) object list 252.

The migration delta analyzer 230 uses the source object list of the on-premise application 220 and the object mapping table 262 to provide an enhanced object mapping table. The enhanced object mapping table represents a delta between the source objects of the particular customer, as used with the on-premise application 220, and objects of the cloud application 240. In this manner, the enhanced object mapping table is specific to the particular customer for the particular migration (i.e., accounts for customizations and extensions of the particular customer that may be different than customizations and extensions of other customers).

In further detail, the migration delta analyzer 230 determines at least a portion of the delta (e.g., process variant, database table fields) between the objects in the on-premise application 220 and objects provided in the cloud application 240. In some examples, the delta can reflect that an object that is used by the on-premise application 220 does not exist in the target cloud application 240 (e.g., the object is no longer used in the target cloud application 240). In some examples, the delta can reflect that the cloud application 240 includes an object that is similar too, but not exactly the same as an object in the object list of the on-premise application 220. In some examples, objects that are determined to be included in and unchanged between both the on-premise application 220 and the cloud application 240 are not accounted for in the delta. That is, if an object of the on-premise application 220 is also used in the target cloud application 240 and features of the object are unchanged in the target cloud application 240 (e.g., underlying object models are determined to be identical), the object is not represented in the delta. This is because, migration of the object will not pose any issues.

In further detail, and as introduced above, the object list of the on-premise application 220 is used to enhance the object table (T_oo-map) with source objects to provide an enhanced object table. Each source object is compared to the target objects in the object table. If a source object does not have a corresponding target object in the object table, the source object is added to the object table. If a source object corresponds to a target object in the object table, but is not identical, the source object is added to the object table referencing the corresponding target object. Accordingly, the object table represents deltas between source objects and target objects.

An example enhanced object table can be provided as:

Example Enhanced Object Table

| Source Object | Target Object | Difference | Reason |
|---|---|---|---|
| E1 | EN11 | Different/Broader case | Best practice changed |
| E1 | EN12 | Different/Narrower case | Best practice changed |
| E2 | N/A | Removed | Functionally removed/Taken over by the provider |
| E2 | E2 (as extension) | Equal | Provided/Computed as extension to handover to customer |
| E3 | E3 | Equal | Optionally take EN31 |
| E3 | EN31 | Different/broader or narrower | New process variant as option to replace old |
| CE4 | CE4 | Equal | Customer extension, can be taken over |
| CE5 | CEN5 | Different | Customer extension needs to be adjusted to public interface/extension point |
| CE6 | EN6 | Different | Customer extension, can be mapped to provider functionality "fit-to-standard" |

In some implementations, reasons provided for the respective differences can be determined from release notes provided for the cloud application 240. For example, for each target object a release note can be provided referencing any differences between the on-premise application 220 and the cloud application 240. For example, for target objects EN11 and EN12 of the example object table above, release notes can indicate that changes were made in the cloud application 240 over the on-premise application 220 in view of changes in best practices, the changes resulting in changes to the target objects relative to corresponding source objects of the on-premise application 220.

In the example object table above, source objects in the on-premise application are mapped to one or more target objects and respective migration options with respect to the cloud application. The differences between the source objects and the target objects in the migration options and corresponding side information are also shown in the example object table. For example, the source object "E1" can be mapped to the target objects EN11 and EN12, where the scope of functionality of the new target objects EN11 and EN12 are different from the source object E1. In detail, the target object EN11 and EN12 can be objects newly developed in the cloud environment by the vendor and can be broader or narrower based on the changes in processes executed by the cloud application.

In this example, the source object "E2" can be considered a "long tail" object, introduced above, which can either be deleted in the target application in the cloud environment or further be created as a new extension in the cloud environment. In this example, the source object "E3" remains in the cloud environment as a target object, however, there is also a new alternative object to replace the object with similar definition or functionality, which may be narrower or broader. In this example, the source objects CE4-CE6 are custom extensions in the on-premise application 220 and are mapped to three kinds of migration options, respectively. The source object CE4 can be migrated to the cloud environment without further changes. The source object CE5 needs to be adjusted, so as to connect the target application through appropriate extension points. The source object CE6 cannot be migrated to the cloud environment without further adjustments. However, in this example, a target object EN6 in the cloud environment provides similar functionality with the source object CE6 and can be treated as the migration option for the source object CE6.

In some implementations, the migration delta analyzer 230 provides migration options for the source objects included in the object table, the migration options indicating how respective objects should be handled during the migration process. In some examples, for custom objects, example migration options include deleting the object, creating an extension, and fitting the object to a standard ("fit-to-standard"). In some examples, deleting the object means that the particular source object will not be created in the cloud application 240. In some examples, creating an extension includes creating an extension object in the cloud application 240 with similar definition to the source object. In some examples, the "fit-to-standard" migration option is only available, if a similar standard object is available, which fits the needs of the customer. For example, the cloud application 240 is queried for an object that is similar to the custom object or a generic object. Examples for certain object types are provided herein.

In some examples, the on-premise object list 252 is assembled by the migration delta analyzer 230 and includes the object list and the URLs corresponding to each object in the object list. The URLs are configured for cross navigation between the objects. The on-premise object list 252 is displayed in the migration support UI 250 as depicted in FIG. 2. In the example depicted in FIG. 2, the migration support UI 250 is configured for the interaction between the migration delta analyzer 230 and the user 210. Through the migration support UI 250, the migration delta analyzer 230 is able to display information to the user 210 and receives instructions from the user 210. The user 210 can be an employee (e.g., an IT specialist) from the enterprise (customer) to make decision regarding the migration process. When the user 210 clicks on one of the URLs, the migration delta analyzer 230 navigates to the related screen in the on-premise application 220 and shows the details for the object corresponding to the selected URL.

In further detail, a list of objects is created by the customer, which object are "in use" by the customer in the on-premise system (e.g., as a subset of all available objects in the on-premise system). The list of changed objects (between on-premise and cloud) is delivered as content in T_oo-map by the software vendor. The intersection of the "in use" and "changed" lists is what is identified in the process, described in further detail herein.

In some implementations, and as introduced above, the migration delta analyzer 230 generates migration options of each object in the object list and provides a mapping (M_old-new) that can be displayed in the migration path and options UI 254. In some examples, the mapping (M_old-new) represents the delta between old objects (source objects) and new objects (target objects) and provides migration options for each new (target) object and old (source) object pair.

In further detail, after creation of the enhanced object table, the mapping (M_old-new) is initialized. The enhanced object table can be considered as including a set of source (old) objects $[O_{S1}, \ldots O_{Sn}]$ (e.g., the source object column) and a set of target (new) objects $[O_{T1}, \ldots O_{Tp}]$ (e.g., the target object column). For each source object $O_{Si}$ in object list, the migration delta analyzer 230 looks up the source object $O_{Si}$ in the enhanced object table to identify a sub-set of target objects $[O_{Tx}, \ldots O_{Ty}]$, where (x≠y, x=1, . . . p, y=0, . . . , p), which includes one or more target objects that could correspond to the source object $O_{S1}$. In some examples, for each target object found for a source object, the migration delta analyzer 230 reads or computes a URL corresponding to target object in the cloud environment.

In some implementations, each source object and corresponding migration options are filled in the mapping (M_old-new). In some examples, for a source object, if there is only one target object matched, the migration delta analyzer 230 adds the migration option of the target object to the mapping and marks it as "matching" or "equal." In some examples, if a target object is identified for a source object, but in some way deviates from the source object, the migration delta analyzer 230 adds the migration option of the target object to the mapping and marks it as "different".

In some implementations, if two or more target objects are found to be similar to the source object, the migration delta analyzer 230 adds the migration options corresponding to the target objects to an option set with information about the differences. In some examples, the option set is added to the mapping. In some examples, the migration options in the option set can be further ranked by the migration delta analyzer 230. In some examples, the migration options in the option sets can be ranked based on parameters regarding cost and time efficiency. In some examples, the ranking of the migration options in the option set can be calculated by using machine learning (ML) models. Specifically, the data set used for ML models can be former uses of the migration delta analyzer 230, as well as usage data of the migration delta analyzer 230 provided by other customer, companies or tenants of the server system 108.

In accordance with implementations of the present disclosure, and with continued reference to FIG. 2, the mapping (M_old-new) is displayed within the migration path and options UI 254 in the migration support UI 250. In some examples, the user 210 is able to view the migration options for each object listed in the migration path and options UI 254. Also, the user 210 is able to use the URLs displayed in the migration support UI 250 to navigate to and receive more details on the objects and the migration options, respectively. Based on this, the user 210 is able to further analyze the advantages and disadvantages of each migration option of the objects.

In some examples, the user 210 can accept the recommendation of the migration option for each object displayed in the migration support UI 250. If one of the objects has multiple migration options (e.g., provided in an options set), the user is able to select one of the migration options from the migration options set. In some examples, the user 210 can create a self-build or self-defined migration option and overwrite the migration option provided by the migration delta analyzer 230. In some examples, information regarding the selection made by the user can be collected together with related feature information and can be used as the data for computation of subsequent ML-based ranking, as described above.

After the user 210 made the confirmation or selection regarding the migrating option of each object in the object list, the migration delta analyzer 230 can receive inputs from the user 210 through the migration support UI 250. In some examples, the migration delta analyzer 230 assembles the cloud object list 256 based on the inputs from the user 210. For example, the migration delta analyzer 230 assembles the cloud object list 256 by filling the target object in the migrating option for each object selected/confirmed by the user 210. The URLs corresponding to each target objects are also filled in the cloud object list 256. In some examples, the cloud object list 256 can also be displayed in the migration support UI 250 for the user to check before the configuration of the target cloud application 240. In some examples, the target cloud application 240 is executed as a SaaS tenant in the server system 108.

In some implementations, the migration delta analyzer 230 configures the cloud application 240 based on the cloud object list 256 and also the migration option corresponding to the target objects in the cloud object list 256. In some examples, the migration delta analyzer 230 also provides extensions based on the cloud object list 256, if there is any target object related to the generation of new extension in the cloud environment. Specifically, for target object related to the generation of new extension, the function of extension object generation is called in the cloud application 240, data fields are pre-populated with values derives from the object in the on-premise application 220. In some examples, the data fields are also displayed through migration support UI 250. The user 210 is able to amend and modify the values and the data fields through migration support UI 250. After receiving input from the user 210 (e.g., the modification and confirmation), the new extension (as one of the target object) can be generated in the cloud application 240. As for target object related to data and data fields, a migration module is generated with an appropriate data migration routine (e.g., data format/type conversion, data split or data merge etc.). In some examples, the data and the data migration routine are also displayed in the migration support UI for the user 210 to confirm or do further amendment.

Figure 3:
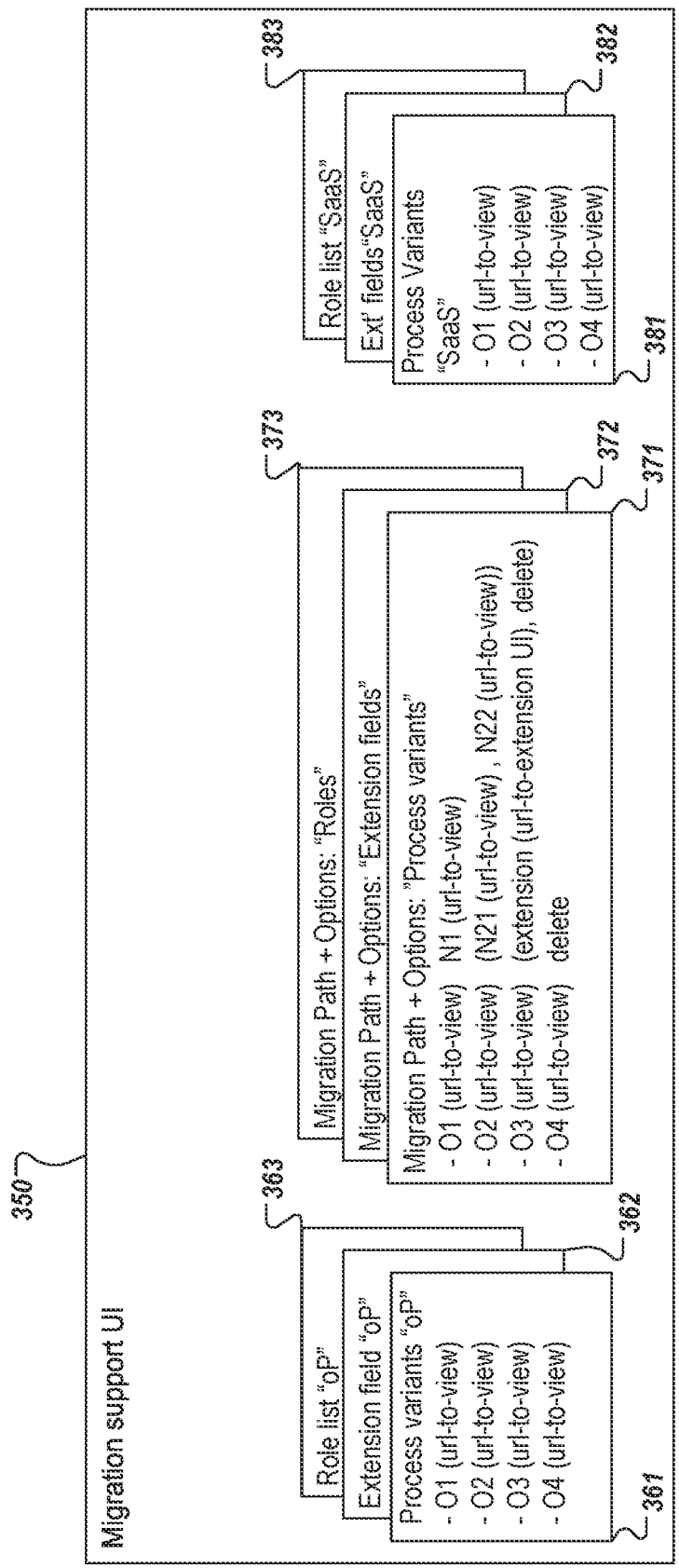
FIG. 3 schematically depict at least a portion of an example migration support user interface (UI) in accordance with implementations of the present disclosure.

FIG. 3 schematically depict at least a portion of an example migration support UI 340 in accordance with implementations of the present disclosure. In the example depicted in FIG. 3, the types of the object in the on-premise application can be categorized and be displayed based on the type of the objects. For example, in some examples, the types of the object include processes and scope, extension field and UI, and roles of user. As depicted in FIG. 3, the objects in the cloud object list 256 shown in FIG. 2 are displayed based on the types of the objects, separately as list of process variant "oP" 361, list of extensions "oP" 362 and role list "oP" 363. The mapping displayed in the migration path and options UI 254 and cloud object list 256 shown in FIG. 2 are also be displayed separately accordingly in the example depicted in FIG. 3. The migration process regarding these three types of objects will be discussed in detail below.

Regarding the objects of processes and variants thereof, in some examples, it is first identified that if a used process (variant) is available as part of the offering in the cloud environment, or is available as a "ready-made handover extension" in the cloud environment covering the cut-off "long-tail" functionality. For managing the migration process of the processes and process variants, the vendor can provide the old process variants in the on-premise application 220 with the corresponding new process variants of the offering in the cloud application 240 in the mapping.

In some examples, for each old process variant, it is specified that, if there is a process variant in the offering of the cloud environment that is same, similar or a variant to the old process variant in the on-premise application 220. In some examples, if there is no new process variant corresponds to the old process variant, the old process variant and the functionality thereof would be removed from the cloud application 240. The customer has to migrate to a different process variant (e.g., select a closest migrating option in a ranked migrating option set). In some examples, if there is the same process variant in the cloud environment provided as a "customer extension," the customer can choose this customer extension as the migrating option and deploy this object as an extension in the cloud environment.

In some examples, it can occur that there are one or more new process variant(s) corresponding to the old process variant in the cloud environment, but new process variant may be different from the old process variant. This can be due to a new best practice based on the update of the server system. It is noted that, in some examples, this can also be in parallel and in addition to the "same process variant as the old."

In some examples, the migration process for the process variants can be run as follows. The on-premise application 220 is read for configuration and active scope. Also, the respective processes and the process variants are read. The new process variants in the cloud environment can be identified from the object mapping table. If there is a same or a similar variant in the cloud environment, the same/similar variant is added to the mapping as one of the migration options to the old process. In some examples, a process variant may no longer be available in the cloud environment. A closest alternative process variant can be visualized in the map 371 and be ranked by the similarity to the old process variant, as options to choose from. If the variant is available as an extension in the cloud environment, the extension can be visualized in the map 371 as one of the migration options. In some examples, if there are additionally differing process variants available in the cloud environment, these can also visualized as one of the migration options and side information could also be added to help the user 210 to select for the most suitable migrating option. In some examples, the information of which new process variants are selected and which process variants or extensions are to be activated is recorded for later configuration of the target cloud application 240.

In some examples, the process variants include "long-tail" functionality. The idea for dealing with migrating objects with long-tail functionality is a "hand-over code ownership to customer." For the vendor of the cloud environment (maybe also the on-premise application), the task is to de-compose the on-premise standard into the cloud-core with a customer-owned extension. To make this work for both the vendor and the customer (e.g., the enterprise), the constraints of lifecycle stable extension programming model should be met. That is, the object with long-tail functionality in the on-premise application 220 will likely be closely embedded into the old code. Thus, object with long-tail functionality cannot be used directly as an extension in the cloud environment.

On the other hand, the new target object long-tail functionality in the cloud environment must be established based on the extensibility programming model and the use of public interfaces, such that the new target object long-tail functionality does not need to be adjusted when the cloud-core of the cloud environment is updated to a new version. As a result, in some examples, the vendor can re-factor the long-tail functionality, modularizes it and offer the modules as "readymade handover extension" in the cloud environment for the customer. This is provided as a "deployment package."

Additionally, the process variants which use this long-tail functionality are annotated to require this deployment package to run. Once the customer deploys the deployment package of the long-tail functionality, the ownership of the code for this deployment package can be handed to the customer. The customer then is able to adjust deployment package based on its own needs, add new functional scope and test/operate the deployment package with the long-tail functionality like other customer owned extensions. By this, the vendor can limit the costs for providing further maintenance to the long-tail functionality, and the customer gets a readymade solution for the desired functionality without building the same functionality from the start.

In some examples, the migration process can identify the object and extension fields that are matched between on-premise application and the cloud application. These objects and extension fields can be migrated automatically. In some examples, for objects and extension fields that are diverse from on-premise application to the cloud application, the usage of the data fields is determined. For example, the number of field values differing from the default in on-premise application to the overall number of rows in the table of the target object is observed. If the data field is not used at all, it can be considered as "not relevant." Further, if the "not relevant" data field is an extension field, the extension field can be shown to the user through the migration path and options: extension fields 372. The user 210 can decide whether to add this extension field to the cloud application and update to "relevant." In some examples, add the extension field to the cloud application requires new developments to the corresponding object.

Continuing with this example, if the field is sparsely used, it can be considered as "sparsely used." The "sparsely used" fields can also be shown to the user 210 through the map 372 and determine whether the user 210 would like to add the field in the target cloud application 240 and update the field to "relevant." Potentially, in some examples, "sparsely used" fields include critical information to the customer. If the data field is typically used, it can be considered as "relevant." In some examples, the user 210 can still decide to opt-out of migrating the "typically used" field and update the field to "not relevant."

In some examples, for the data fields which are "relevant," or the data fields selected by the user to be migrated, the data fields are further analyzed for the field mapping recommendation. The analysis regarding the data field is to identify, if the data field is related to an "long-tail" scenario. If yes, the deploy package with the extension fields and the related code can be developed and deployed like the process variant with long-tail functionality. If the data field is not part of an available extension package, the data field can be handled individually. For example, one of the options in an ordered set of options can be used to resolve this deviation:

Option 1: Take a data field from the standard field defined in the cloud environment which is similar to the old field in the on-premise application;

Option 2: Create a customer extension field;

Option 3: Take a generic field from the standard field defined in the cloud environment and use the standard field for the content in the old field in the on-premise application; and Option 4: Drop the field.

In some examples, option 1 can be skipped, if no similar standard field can be identified in the cloud environment. It is noted that "similar" is defined herein as, the standard field must be on the same table or on the same business object node having the same key as the old original data field; the standard field must have the same data type with the old data field or a data type with an automatic conversion routine; and the found similar standard field have sufficient length to store the existing data without information loss. In some examples, option 1 can be extended by machine learning, using information like the field name, field short text description or UI text to assess, if a standard field is a good match. In some examples, option 2 can be skipped, if there is no extension point on the table that corresponds to the data field or the business object node that the original data field was added to. The user 210 can be notified that there is no extension point on this table/business object node. If the customer still would like to store the data within this data field, a more complex construction is required with an additional customer-table and joint views. Additionally, a process can be established to request an extension point from the vendor. In some examples, option 3 is skipped, if there is no generic field to the table or the business object node that the original data field is attached to. The key must be the same to the original data field, otherwise the generic field cannot be used and option 3 should be skipped.

In some examples, options 1-4 can be ranked for recommendation to the user 210. If option 1 exists, the independent usage of option 1 can be recommended. If option 1 does not exist, an option out from the remaining options 2-4 is selected. If the original data field is "sparsely used," option 4 is recommended. If the data field is "frequently used," option 2 or 3 (if available) is recommended. In some examples, the customer can overwrite and select option 2 instead of option 4, or select option 4 instead of option 2 or 3. In some examples, the extension fields on the start release are transformed to extension objects and includes also the UI definitions. Thus, these extension fields are also added to the map 372. An example of handling the migration options of the object and data fields is provided as follows:

| Example Migration Options | | |
|---|---|---|
| Old Field | New Field | Details |
| Standard old | Different standard new (e.g. type, field length, composition/de-composition, generic field) | Different data type or (slightly different) semantics Decision of customer involved → map to new or extension or drop |
| Standard old | Dropped in standard → extension | Option 2 or option 3 |
| Standard old | Dropped in standard → drop as well | |
| Custom field added by modification | Standard new | Option 3 if the extensions are only rarely filled with data Or option 1 |
| Custom field added by modification | Extension field | |
| Custom field added by modification | Drop, optionally with archiving | |

In some instances, authorizations of users can differ between the on-premise application and the target cloud application. That is, a role of user may have different scope of permission or authorization of accessing certain data or functionalities. The changes can be that the provided roles of user can have a narrower/more constrained scope, a same scope, or a broader scope of permission or authorization. As a result of having different scope of authorization, the number of data sets that can be accessed by a certain user role is different. Also, this change may affect both write/read or read-only accesses.

If the changed roles are used in role collections, users can potentially do less (or more) within the cloud application than in the on-premise application. In some examples, the changes in authorization of the user roles needs to be managed by the administrator (e.g., the user 210) during the migration process to decide whether the changes are acceptable or whether an adjustment should be made based on the practical operation.

In some examples, the vendor can provide a set of authorizations "admin-authorizations" available in the on-premise application, which are related to administrative tasks. Specifically, the "admin-authorizations" set can be related to the administrative tasks that are operated by the customer in the on-premise application, but are covered by the SaaS operation team from the vendor and thus have no longer to be maintained by the customer. In some examples, the set of "admin-authorizations" are removed from the target object list, as the deviation is intended and does not cause any degradation.

In some examples, the customer may create "role collections" in the on-premise application and assign these roles to actual users (e.g., employees in the enterprise). In some examples, the "role collections" includes roles defined by the vendor and the roles are a set of "authorization objects" also defined by the vendor. The "authorization objects" define authorization of access (e.g., read or modify) to data and access to UI screens. To manage the migration process of the roles, the vendor can provide a mapping table of the old roles available on-premise application and the offering in the cloud environment. In some example, for each role, it is specified that: the role is the same or similar in granted access; the role is no longer available (e.g. the role is within the "admin-authorizations" set); there are one or more roles, which are "more powerful" (e.g., granting access to more objects or granting also write access (in addition to read access); and there are one or more roles, which are "less powerful" (e.g., granting access to less objects or granting only read and no longer write access.)

In some examples, in the migration process, the set of role collections are read from the on-premise application and the roles assigned to the role collections are also read. For each role collection, a new/target collection to be deployed in the cloud application is created. For each role in the old role collection, the map "migration path and options: roles" 373 is assembled and displayed to the user 210. Specifically, for each old role in the on-premise application, if there is a similar new role, then the new role can be added to the new role collection, with a related remark ("is similar"). If there is no new role similar to the old role, it is annotated, and this role will no longer be part of the role collection. The remark will be also shown in the map 373 that the user 210 can be notified. If there are one or more new roles with less or more access permissions than the old roles, these new roles are added as migration options to the role collection with the respective comments.

After the map 373 is assembled, the user 210 can view the visualization of the role selection and have comparison of the old roles with new roles. In the map 373 of the migration support UI 350, the old roles and new/target roles are shown with side information including the difference and reason thereof. The user 210 can navigate to the old roles or new roles and identify the granted access of each old and new role. The user 210 can decide on the target roles to select for the target role collection. In some examples, the information of migrating from the old roles to the new roles would be generated for the users that are assigned to the role or role collections. That is, if the users (e.g., employees such as the user 110) are migrated to access the cloud application, the users can then be assigned to the correct new role collections.

An example of migration options of role collections is provided as:

| Example Migration Options of Role Collections | | | |
|---|---|---|---|
| Old Role | New Role | Difference | Reason |
| R1 | RN11 | More | Data model changed |
| R1 | RN12 | Less | Data model changed |
| RA1 | n/a | No access | Role in the "admin-authorizations" set |
| RL1 | n/a | No access | Functionality removed |
| R3 | R3 | Equal | Still valid, but other option (RN31) available |
| R3 | RN31 | More | Functionality enhanced |

In some implementations, the objects in the object list may also include coding artifacts. For example, customer modifications of code and usage of non-public interfaces in code are problematic to handle, the code base might be altered and the used interfaces might not be available any longer after migrating to the cloud environment. In some examples, the customer coding artifacts are identified and analyzed to determine whether the coding artifacts still match code base and the public interfaces or the extension points. If yes, the code artifacts can be migrated to the cloud environment. If the code base no longer exists in the cloud environment, it is further analyzed whether the code base is part of a "long-tail" extension. If yes, the extension can be deployed, and the code can be adjusted to run on the extension. Further, if the customer coding artifacts do not fit to the new vendor code base and public interfaces, while the called code modules still exist in the cloud environment, these customer coding artifact are to be collected in a list and brought to attention of the developers (e.g., display the list in the migration support UI 250). The available extensibility points in the vendor code module of the cloud environment can also be shown. In some examples, the extensibility points include Business Add-In (BAdI), extension points, public interfaces and APIs. In some examples, this process can be supported with coding suggestions based on adjustments other developers did to their code in a similar situation.

Figure 4:
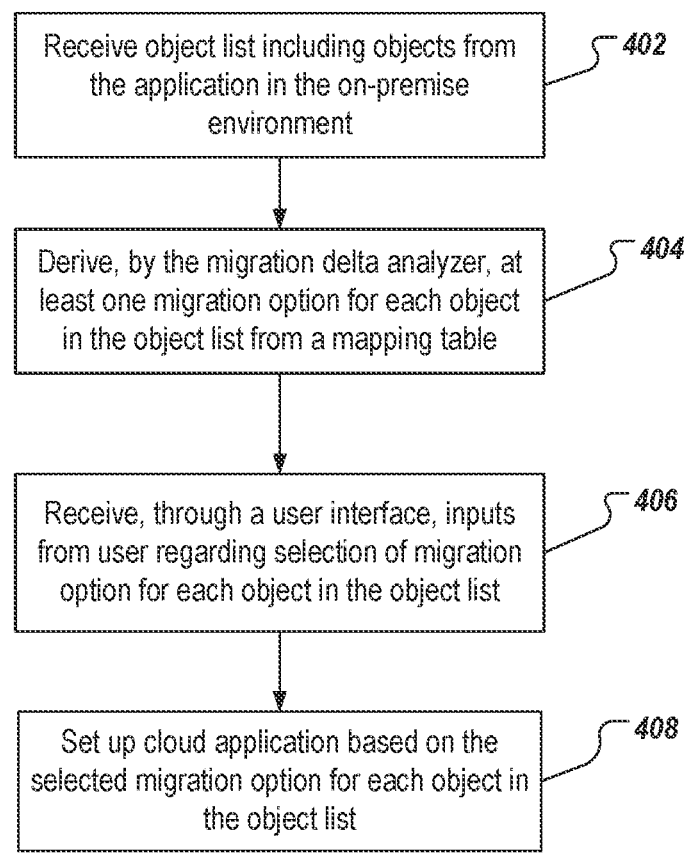
FIG. 4 depicts an example process that can be executed in accordance with implementations of the present disclosure.

FIG. 4 depicts an example process that can be executed in accordance with implementations of the present disclosure. In some examples, the example process 400 is provided using one or more computer-executable programs executed by one or more computing devices (e.g., the server system 108 of FIG. 1). The example process 400 is executed for migrating an application from an on-premise environment to a cloud environment.

An object list is received from the application in the on-premise environment by a migration delta analyzer in the software system (402). The objects in the list are objects used in the on-premise application and the type of object may include process, objects and data fields, and user roles. The one or more migration options for each object in the object list is derived and displayed to user in a UI (404). The migration delta analyzer derives the migration options by looking up an object mapping table. The migrating option can be migrating the object to a same or similar object, deleting the object or creating an extension in the cloud environment that has the same functionality as the object.

If the object cannot be found in the object mapping table, for example, the object is an extension made by the customer, the migration delta analyzer can add this object in to the object mapping table and create the migration option for the object. Specifically, the migration delta analyzer is able to query the cloud application and determine whether there are any target objects in the cloud application that is similar to the object. If yes, the migration delta analyzer writes the target object and corresponding action as one of the migration options in the object mapping table. The target object that is similar to the object can be the situation that the target object is the same with object, the target object is similar but has a narrower or broader scope or the target object is different from the object but is able to provide similar functionality.

Further, the user is able to select one of the migration options of each object from the UI. On the UI, URLs corresponding to each objects and target objects in the migration options are also displayed for the user to navigate the objects with further details. Ranking and other side information (differences/deviations) can also be displayed to the user for aiding the selection of migration option for each object.

Inputs from the user indicating selection of a migration option for each object in the object list is received by the migration delta analyzer through the UI (406). The migration delta analyzer assembles a target object list based on the selected migration option for each object in the object list. A cloud application in the cloud environment is configured based on the selected migration options from the user and also the target object list (408).

Figure 5:
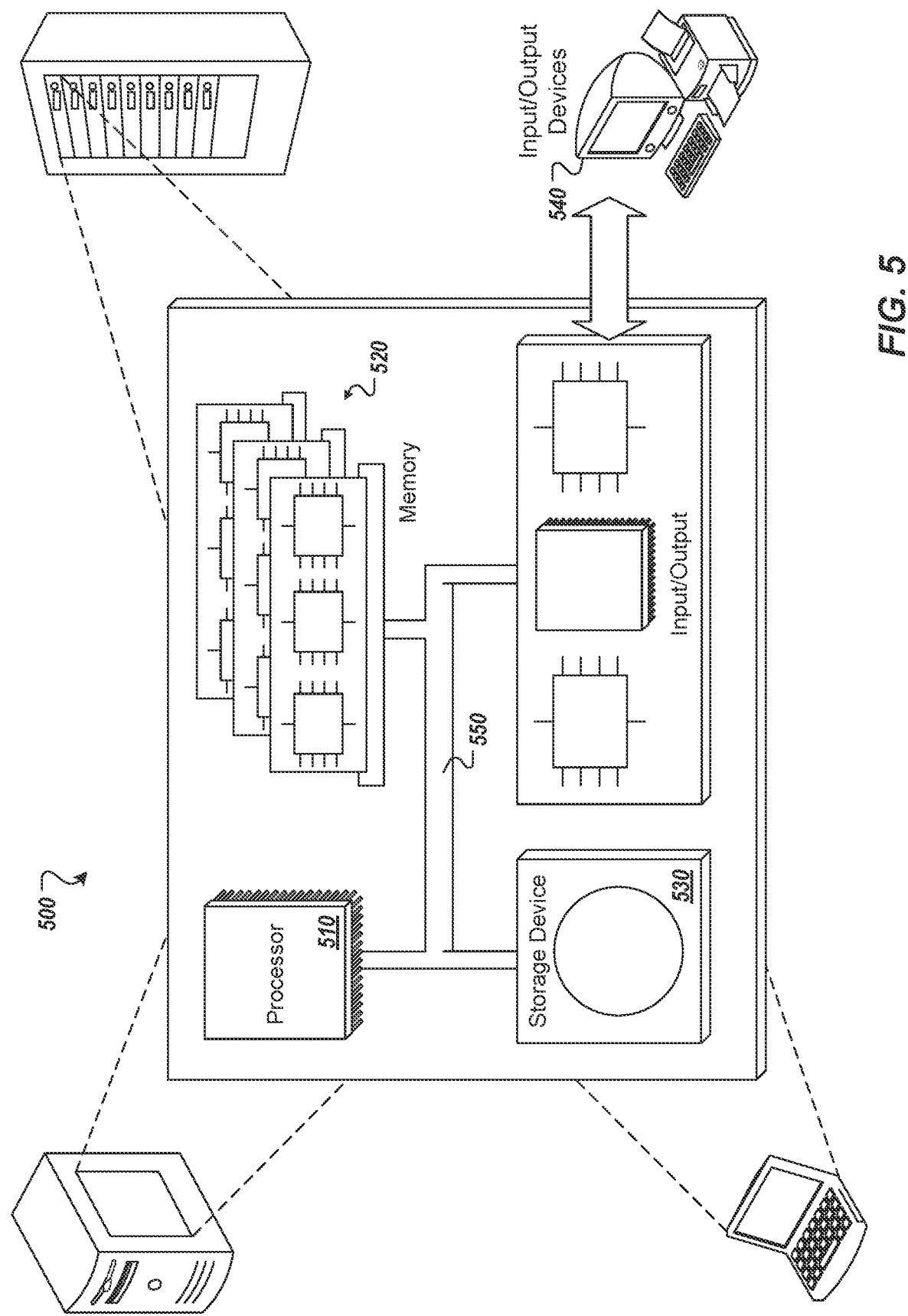
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for migration of one or more of objects and code from an on-premise application to a cloud application, the method comprising:
   determining, by a migration delta analyzer, one or more migration options for each object in an object list using a mapping table based on the types of the objects, the object list comprising objects accessed by the on-premise application and the objects comprising a plurality types of objects;
   displaying, through a user interface and for each object in the object list, one or more migration options based on a type of the object;
   receiving, through the user interface, input from a user representing a selection of a migration option for each object in the object list; and
   providing a cloud application based on migration options selected for objects in the object list.

2. The method of claim 1, further comprising:
   adding, by the migration delta analyzer, a customer extension to the mapping table, the object comprising the customer extension;
   querying, by the migration delta analyzer, the cloud application for at least one target object similar to the customer extension; and filling the mapping table with the at least one target object as at least one migration option of the customer extension.

3. The method of claim 1, further comprising:
ranking the at least one migration option for each object in the object list; and
displaying the at least one migration option for each object in the object list based on the ranking.

4. The method of claim 1, further comprising:
displaying, through the UI, uniform resource locators (URLs) corresponding to each object in the object list and the at least one migration option for each object in the object list.

5. The method of claim 1, wherein the at least one migration option comprises a match of a target object in the cloud applications, a deletion of the object and a creation of extension corresponding to the object in the cloud application.

6. The method of claim 1, wherein the objects in the object list comprise business process, business objects and fields thereof, and user roles.

7. The method of claim 6, wherein the at least one migration option corresponding to an object of business process in the object list comprises a business process variant and a long-tail process.

8. A non-transitory computer-readable storage medium coupled to one or more processors and having instructions stored thereon which, when executed by the one or more processors, cause the one or more processors to perform operations for from an on-premise application to a cloud application, the operations comprising:
determining, by a migration delta analyzer, one or more migration options for each object in an object list using a mapping table based on the types of the objects, the object list comprising objects accessed by the on-premise application and the objects comprising a plurality types of objects;
displaying, through a user interface and for each object in the object list, one or more migration options based on a type of the object;
receiving, through the user interface, input from a user representing a selection of a migration option for each object in the object list; and
providing a cloud application based on migration options selected for objects in the object list.

9. The non-transitory computer-readable storage medium of claim 8, wherein operations further comprise: adding, by the migration delta analyzer, a customer extension to the mapping table, the object comprising the customer extension; querying, by the migration delta analyzer, the cloud application for at least one target object similar to the customer extension; and filling the mapping table with the at least one target object as at least one migration option of the customer extension.

10. The non-transitory computer-readable storage medium of claim 8, wherein operations further comprise: ranking the at least one migration option for each object in the object list; and displaying the at least one migration option for each object in the object list based on the ranking.

11. The non-transitory computer-readable storage medium of claim 8, wherein operations further comprise: displaying, through the UI, uniform resource locators (URLs) corresponding to each object in the object list and the at least one migration option for each object in the object list.

12. The non-transitory computer-readable storage medium of claim 8, wherein the at least one migration option comprises a match of a target object in the cloud applications, a deletion of the object and a creation of extension corresponding to the object in the cloud application.

13. The non-transitory computer-readable storage medium of claim 8, wherein the objects in the object list comprise business process, business objects and fields thereof, and user roles.

14. The non-transitory computer-readable storage medium of claim 13, wherein the at least one migration option corresponding to an object of business process in the object list comprises a business process variant and a long-tail process.

15. A system, comprising:
a computing device; and
a computer-readable storage device coupled to the computing device and having instructions stored thereon which, when executed by the computing device, cause the computing device to perform operations for migration of one or more of objects and code from an on-premise application to a cloud application, the operations comprising:
determining, by a migration delta analyzer, one or more migration options for each object in an object list using a mapping table based on the types of the objects, the object list comprising objects accessed by the on-premise application and the objects comprising a plurality types of objects;
displaying, through a user interface and for each object in the object list, one or more migration options based on a type of the object;
receiving, through the user interface, input from a user representing a selection of a migration option for each object in the object list; and
providing a cloud application based on migration options selected for objects in the object list.

16. The system of claim 15, wherein operations further comprise:
adding, by the migration delta analyzer, a customer extension to the mapping table, the object comprising the customer extension;
querying, by the migration delta analyzer, the cloud application for at least one target object similar to the customer extension; and
filling the mapping table with the at least one target object as at least one migration option of the customer extension.

17. The system of claim 15, wherein operations further comprise:
ranking the at least one migration option for each object in the object list; and
displaying the at least one migration option for each object in the object list based on the ranking.

18. The system of claim 15, wherein operations further comprise:
displaying, through the UI, uniform resource locators (URLs) corresponding to each object in the object list and the at least one migration option for each object in the object list.

19. The system of claim 15, wherein the at least one migration option comprises a match of a target object in the cloud applications, a deletion of the object and a creation of extension corresponding to the object in the cloud application.

20. The system of claim 15, wherein the objects in the object list comprise business process, business objects and fields thereof, and user roles.

* * * * *